United States Patent
Hsu et al.

(10) Patent No.: US 11,418,631 B2
(45) Date of Patent: Aug. 16, 2022

(54) EFFICIENT PACKET DELIVERY METHODS AND ASSOCIATED COMMUNICATIONS APPARATUS

(71) Applicant: MEDIATEK INC., Hsin-Chu (TW)

(72) Inventors: Chin-Wei Hsu, Hsinchu (TW); Jia-Shi Lin, Hsinchu (TW); Ming-Cong Sun, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 159 days.

(21) Appl. No.: 16/914,438

(22) Filed: Jun. 28, 2020

(65) Prior Publication Data

US 2021/0029226 A1 Jan. 28, 2021

Related U.S. Application Data

(60) Provisional application No. 62/877,944, filed on Jul. 24, 2019.

(51) Int. Cl.
| | | |
|---|---|---|
| *G06F 15/16* | (2006.01) | |
| *H04L 69/18* | (2022.01) | |
| *H04L 69/28* | (2022.01) | |
| *H04L 69/323* | (2022.01) | |
| *H04L 69/329* | (2022.01) | |
| *H04L 69/325* | (2022.01) | |
| *H04L 69/326* | (2022.01) | |

(52) U.S. Cl.
CPC .............. *H04L 69/18* (2013.01); *H04L 69/28* (2013.01); *H04L 69/323* (2013.01); *H04L 69/325* (2013.01); *H04L 69/326* (2013.01); *H04L 69/329* (2013.01)

(58) Field of Classification Search
CPC ........ H04L 69/18; H04L 69/28; H04L 69/323
USPC ............................................ 709/203; 370/469
See application file for complete search history.

(56) References Cited

U.S. PATENT DOCUMENTS

| | | | |
|---|---|---|---|
| 2011/0170548 A1* | 7/2011 | Kang | H04L 1/1841 370/394 |
| 2019/0053098 A1 | 2/2019 | Jo | |
| 2019/0053099 A1 | 2/2019 | Kim | |
| 2019/0075585 A1* | 3/2019 | Deogun | H04W 72/1268 |
| 2019/0159065 A1 | 5/2019 | Kim | |
| 2019/0335364 A1* | 10/2019 | Liu | H04W 36/0077 |
| 2022/0006753 A1* | 1/2022 | Sebire | H04L 47/22 |

FOREIGN PATENT DOCUMENTS

| | | |
|---|---|---|
| CN | 109392195 A | 2/2019 |
| WO | 2009/070576 A2 | 6/2009 |
| WO | 2015/165418 A1 | 11/2015 |

\* cited by examiner

*Primary Examiner* — Duyen M Doan
(74) *Attorney, Agent, or Firm* — Winston Hsu

(57) ABSTRACT

A communications apparatus includes a receiver and a processor. The receiver is configured to receive wireless signals. The wireless signals include a plurality of packets. The processor is coupled to the receiver and includes a first logic configured to perform operations of a first protocol layer and a second logic configured to perform operations of a second protocol layer higher than the first protocol layer. The operations of the first protocol layer includes: starting a timer in response to receiving a first packet with a first count value that is different from a deliver count value; and delivering a second packet with a second count value that is different from the deliver count value to the second logic before the timer expires.

16 Claims, 8 Drawing Sheets

EFFICIENT PACKET DELIVERY METHODS AND ASSOCIATED COMMUNICATIONS APPARATUS

CROSS REFERENCE TO RELATED APPLICATIONS

This application claims the benefit of U.S. Provisional Application No. 62/877,944 filed Jul. 24, 2019, the entirety of which is incorporated by reference herein.

BACKGROUND

Long Term Evolution (LTE) is a set of enhancements to the Universal Mobile Telecommunications System (UMTS) mobile standard promulgated by 3rd generation partnership project (3GPP) for enabling high-speed packet communications. After LTE, 5G (fifth generation) New Radio (NR) is a new Radio Access Technology (RAT) developed by 3GPP for the 5G mobile network.

As compared to the LTE, the 5G NR technology has great improvements in high speed and short latency communication. However, there is still some undesired internal latency which may influence the service quality and user experience. For example, as defined in the 3GPP specification TS 38.323, Packet Data Convergence Protocol (PDCP) reordering is a function used to guarantee the order of packets delivered by the PDCP layer. However, the reordering operations may cause the undesired internal timing latency.

To solve this problem, efficient packet delivery methods for efficiently delivering packets within a communications apparatus and an associated communications apparatus are required.

SUMMARY

It is an objective of the invention to solve the timing latency problem when PDCP reordering is configured. By applying the proposed methods for efficiently delivering packets within a communications apparatus, when PDCP reordering is configured and the timer t-Reordering is started, the upper layer logic or the application does not have to wait for the expiry of the timer t-Reordering and the problem of unnecessary and undesired timing latency that may be generated when PDCP reordering is configured can be solved.

According to an embodiment of the invention, a communications apparatus comprises a receiver and a processor. The receiver is configured to receive wireless signals. The wireless signals comprise a plurality of packets. The processor is coupled to the receiver and includes a first logic configured to perform operations of a first protocol layer and a second logic configured to perform operations of a second protocol layer higher than the first protocol layer. The operations of the first protocol layer comprises: starting a timer in response to receiving a first packet with a first count value that is different from a deliver count value; and delivering a second packet with a second count value that is different from the deliver count value to the second logic before the timer expires.

According to another embodiment of the invention, a method for delivering packets within a communications apparatus comprising: starting a timer in response to receiving a first packet with a first count value that is different from a deliver count value by a first logic configured to perform operations of a first protocol layer; and delivering a second packet with a second count value that is different from the deliver count value by the first logic to a second logic configured to perform operations of a second protocol layer higher than the first protocol layer before the timer expires.

These and other objectives of the present invention will no doubt become obvious to those of ordinary skill in the art after reading the following detailed description of the embodiment that is illustrated in the various figures and drawings.

DETAILED DESCRIPTION

Figure 1:
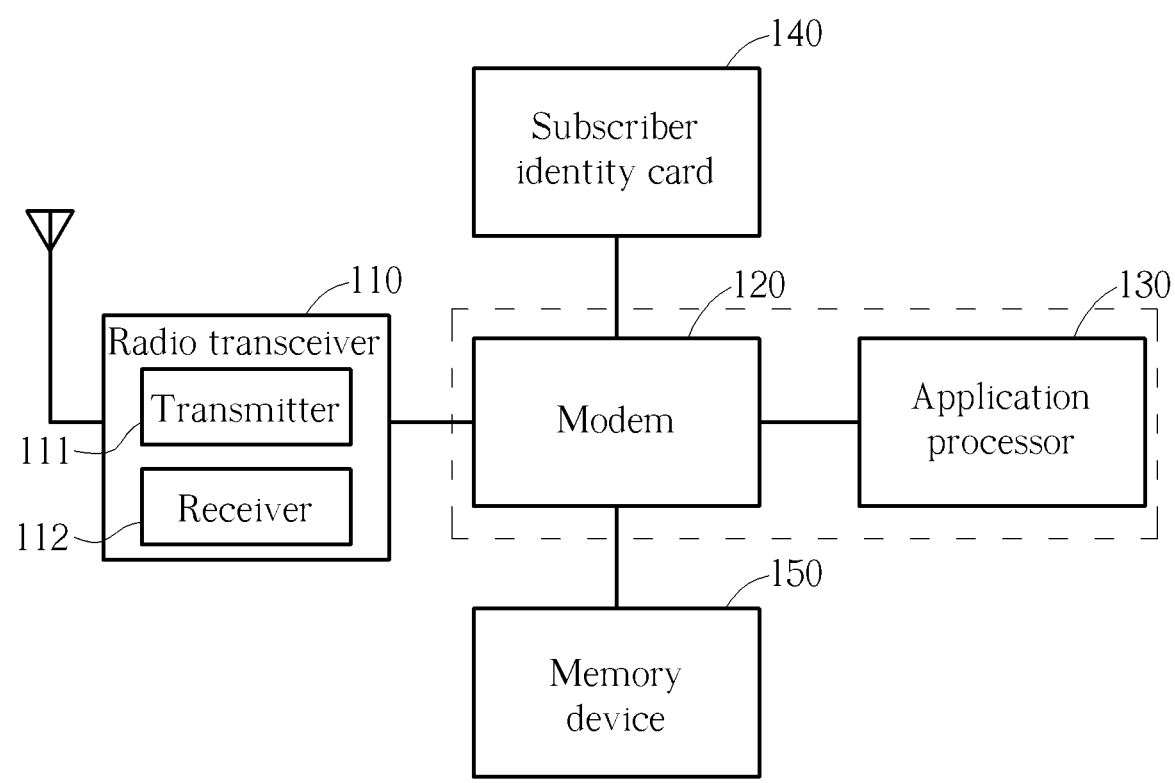
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 may comprise a receiver 112 configured to receive wireless signals from an air interface via the antenna module and a transmitter 111 configured to transmit wireless signals to the air interface via the antenna module, and the radio transceiver 110 may be configured to perform RF signal processing. For example, the receiver 112 may convert the received signals into intermediate frequency (IF) or baseband signals to be processed, or transmitter 111 may receive the IF or baseband signals from the modem 120 and convert the received signals into wireless signals to be transmitted to a network device in an access network (e. g. a cellular network or a wireless local access network). According to an embodiment of the invention, the network device may be a cell, a node B, an evolved node B (eNB), a g node B (gNB), a base station, a Mobility Management Entity (MME), an Access and Mobility Management Function (AMF) device, an access point (AP), etc., at the network side and communicating with the communications apparatus 100 via the wireless signals.

The transmitter 111 and the receiver 112 of the radio transceiver 110 may comprise a plurality of hardware devices to perform radio frequency (RF) conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
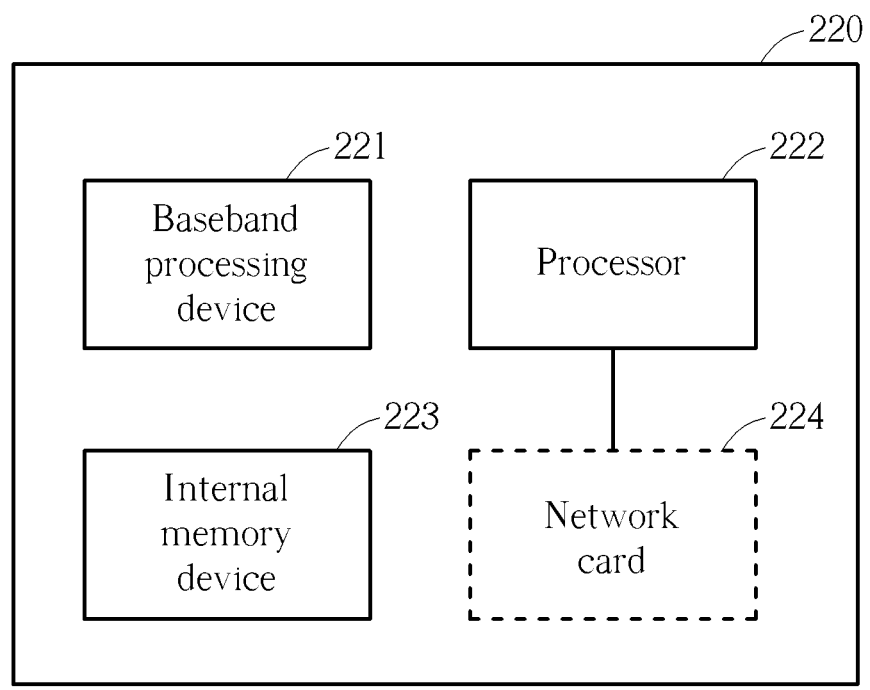
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals incompliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RAT operations. Therefore, the invention should not be limited to what is shown in FIG. 2.

According to an embodiment of the invention, the processor 222 may comprise a plurality of logics, each, designed for handling one or more functionalities. The logics may be configured to execute the program codes of one or more software and/or firmware modules, thereby performing the corresponding operations. For example, the processor 222 may comprise at least a first logic configured to perform operations of a first protocol layer and a second logic configured to perform operations of a second protocol layer higher than the first protocol layer. For easy understanding, the second protocol layer is hereinafter named as an upper layer. In one example, the first protocol layer is a PDCP layer and the upper layer includes at least one of an Internet layer, a transport layer, and an application layer. For easy understanding, the first and second logics are respectively hereinafter named as a PCDP layer logic and an upper layer logic.

When performing the corresponding operations by executing the corresponding programs, the logics may be regarded as dedicated hardware devices or circuits, such as dedicated processor sub-units.

As discussed above, PDCP reordering is a function used to guarantee the order of packets delivered by the PDCP layer to the upper layer. When PDCP reordering is configured by a network device (such as a gNB), communicating with the communications apparatus 100, the PDCP layer logic should deliver the received packets to the upper layer logic based on the PDCP count values sequentially.

Figure 3:
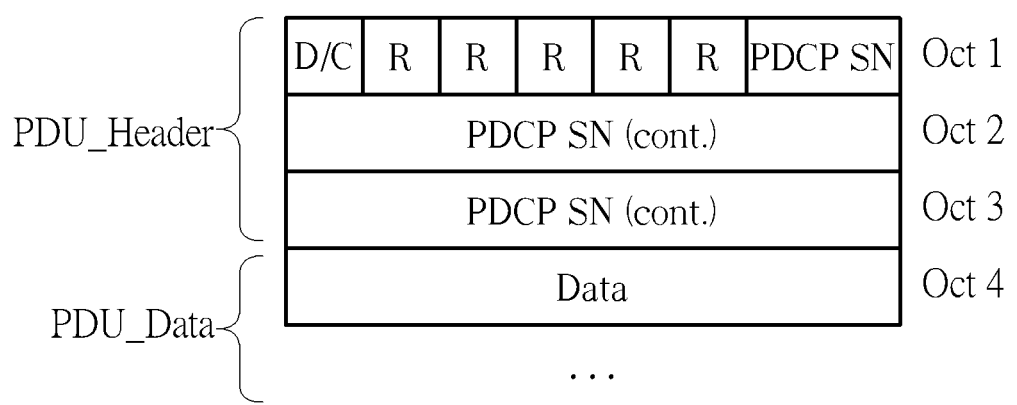
FIG. 3 shows a PDCP Data PDU format for 18 bit sequential number (SN) as an example.

The packet received by the PDCP layer is PDCP Data Protocol Data Unit (PDU). The PDCP Data PDU comprise a header portion and a data portion, and the data portion is the PDCP Service Data Unit (SDU). FIG. 3 shows a PDCP Data PDU format for 18 bit sequential number (SN) as an example. The PDCP Data PDU format for 18 bit has a header portion in the first three bytes and a data portion starting from the fourth bytes, but the invention is not limited to this format. The PDCP layer logic may read the PDCP SN field in the header portion of the packet to obtain the PDCP count value.

Figure 4:
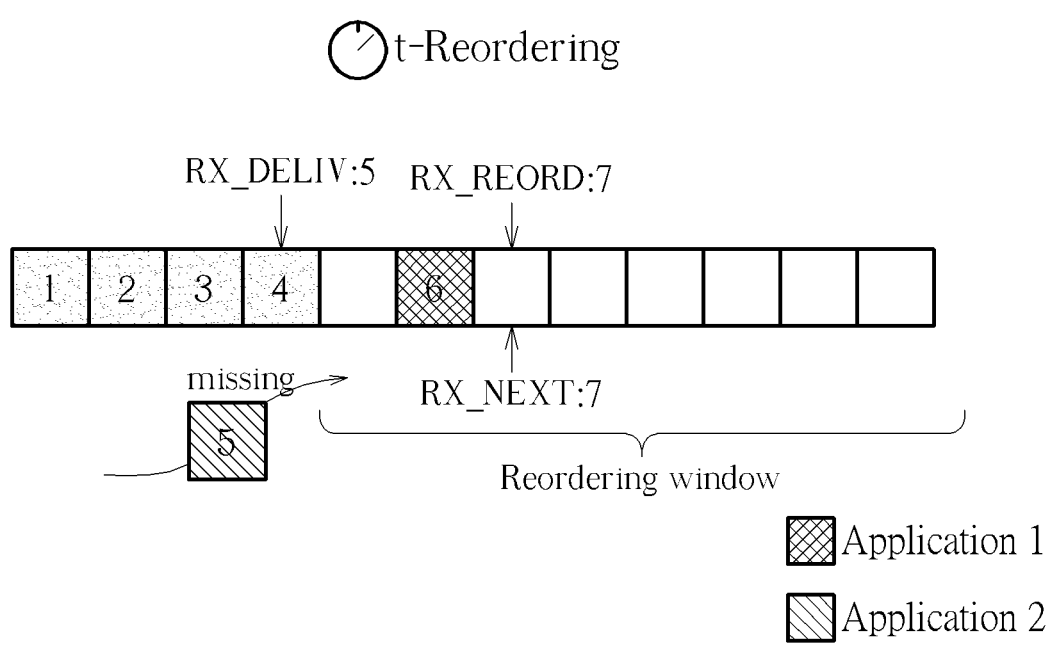
FIG. 4 is an exemplary scenario showing the packet delivering order when the PDCP reordering is configured according to an embodiment of the invention.

FIG. 4 is an exemplary scenario showing the packet delivering order when the PDCP reordering is configured according to an embodiment of the invention. There are some variables utilized when performing PDCP reordering, comprising at least the variable RX_DELIV and the variable RX_NEXT. RX_DELIV indicates a deliver count value that is the count value of the first PDCP SDU not delivered to the upper layer, but still waited for. RX_NEXT indicates a next count value that is the count value of the next PDCP SDU expected to be received. Initially, RX_DELIV and RX_NEXT are both set to 1. First, if the PDCP layer logic receives a packet having a PDCP count value 1 (named as the packet 1 for brevity) same as RX_DELIV, the PDCP layer logic may deliver packet 1 to the upper layer logic and set both RX_DELIV and RX_NEXT set to 2. Next, if the PDCP layer logic receives packets 2~4, the PDCP layer logic may deliver the packets 2~4 to the upper layer logic in order and set both RX_DELIV and RX_NEXT to 3~5 sequentially. Then, if the PDCP layer logic receives packet 6 while packet 5 has not been received, since the PDCP count number 6 of the packet 6 is different from the RX_DELIV 5, the PDCP layer logic will not deliver the packet 6 to the upper layer logic and set RX_NEXT to 7. Then, in response to determining that RX_DELIV 5 is smaller than RX_NEXT 7, the PDCP layer logic will start a timer t-Reordering as defined in the 3GPP Specification TS 38.323 to wait for the missing packet 5, and the packet 6 cannot be delivered to the upper layer logic until the timer t-Reordering expires. In addition, before the timer t-Reordering expires, if the subsequent packets in a Reordering window, such as packets 8~10, are received, the packets 8~10 should be kept in a buffer and cannot be delivered to the upper layer logic as well.

However, in a case that the missing packet 5 is for Application 2 (e.g., a downloading file application) and the received packet 6 is for Application 1 (e.g., a video streaming application), the wait for the missing packet 5 may cause unnecessary and undesired timing latency for Application 1, which may exacerbate the user experience. To solve this problem, methods for efficiently delivering packets within a communications apparatus are required.

Figure 6:
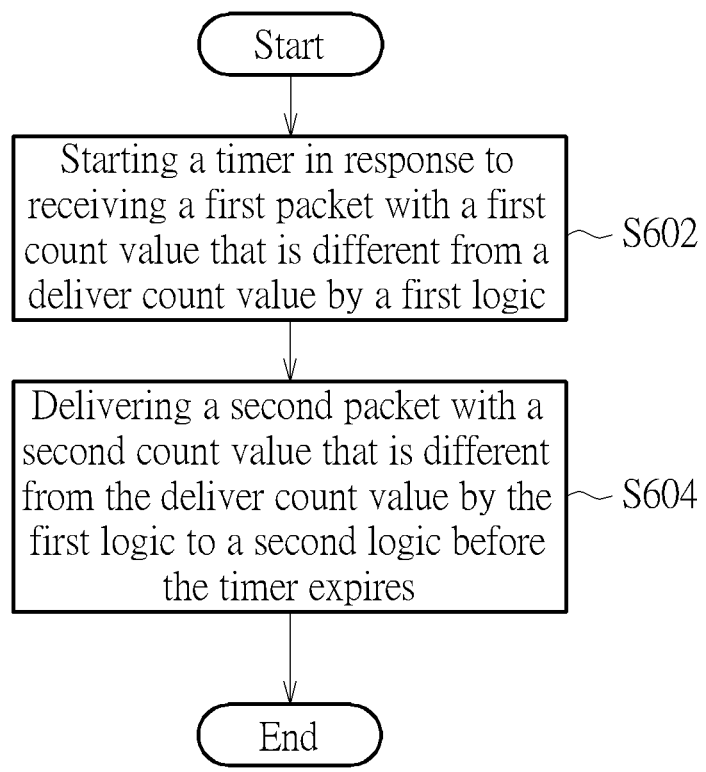
FIG. 6 is a flow chart of a method for efficiently delivering packets within a communications apparatus when PDCP reordering is configured according to an embodiment of the invention.

FIG. 6 is a flow chart of a method for efficiently delivering packets within a communications apparatus when PDCP reordering is configured according to an embodiment of the invention.

Step S602: a timer (e.g. the timer t-Reordering) is started in response to receiving a first packet with a first count value (e.g., the PDCP count value) that is different from a deliver count value (e.g., RX_DELIV) by a first logic configured to perform operations of a first protocol layer; and Step S604: a second packet with a second count value that is different from the deliver count value is delivered by the first logic to a second logic configured to perform operations of a second protocol layer higher than the first protocol layer before the timer expires.

In the embodiments of the invention, the second packet may be the first packet that causes the timer t-Reordering to be started, or may be any packet received after the timer is started.

In the embodiments of the invention, the first protocol layer may be the PDCP layer, and the second protocol layer (hereinafter referred to as an upper layer for brevity)

includes at least one of an Internet layer, a transport layer, and an application layer. In addition, in some embodiments, one or more applications form the application layer.

In addition, according to an embodiment of the invention, the first logic delivers the received packets to the upper layer logic by delivering information regarding the received packets to the upper layer logic. The information regarding the received packets is for example a buffer address of the received packet. With the buffer address, the application(s) may read the buffer to obtain the content of the packet (such as the PDCP SDU as discussed above).

By applying the proposed methods for efficiently delivering packets, the second packet with the second count value that is different from the deliver count value can be delivered to the upper layer before the timer expires. For the exemplary scenario as shown in FIG. 4, the Application 1 may receive the packet 6 before the timer t-Reordering expires without waiting for the expiry of the timer t-Reordering. In this manner, more efficient packet delivering can be achieved.

Figure 7:
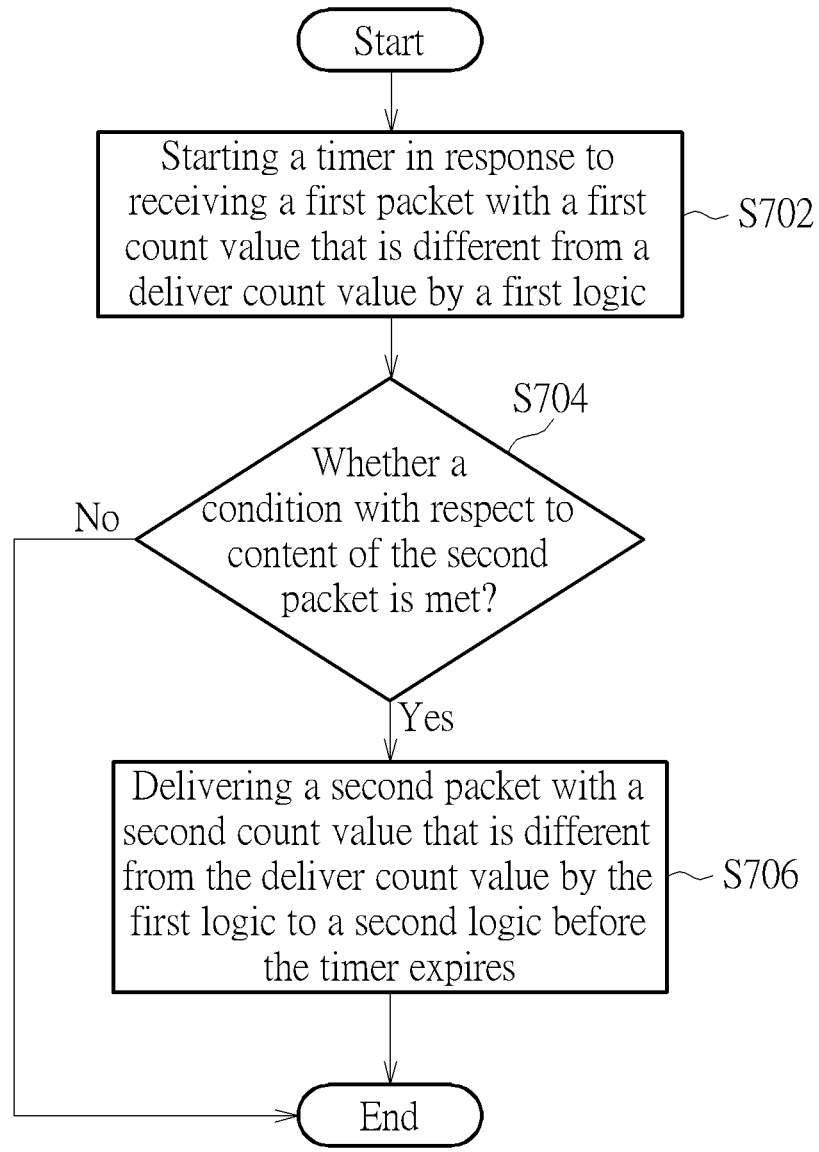
FIG. 7 is a flow chart of a method for efficiently delivering packets within a communications apparatus when PDCP reordering is configured according to another embodiment of the invention.

FIG. 7 is a flow chart of a method for efficiently delivering packets within a communications apparatus when PDCP reordering is configured according to another embodiment of the invention.

Step S702: a timer (e.g. the timer t-Reordering) in response to receiving a first packet with a first count value (e.g., the PDCP count value) that is different from a deliver count value (e.g., RX_DELIV) is started by a first logic configured to perform operations of a first protocol layer.

Step S704: whether a condition with respect to content of a second packet with a second count value that is different from the deliver count value is met is determined. If yes, step S706 is entered. If no, the procedure is ended.

Step S706: in response to the condition being determined as having been met, the second packet with the second count value that is different from the deliver count value is delivered by the first logic to a second logic configured to perform operations of a second protocol layer higher than the first protocol layer before the timer expires.

In one embodiment, for the no path of step S704, the procedure is ended and first logic may not deliver the received packet to the second logic.

Figure 8:
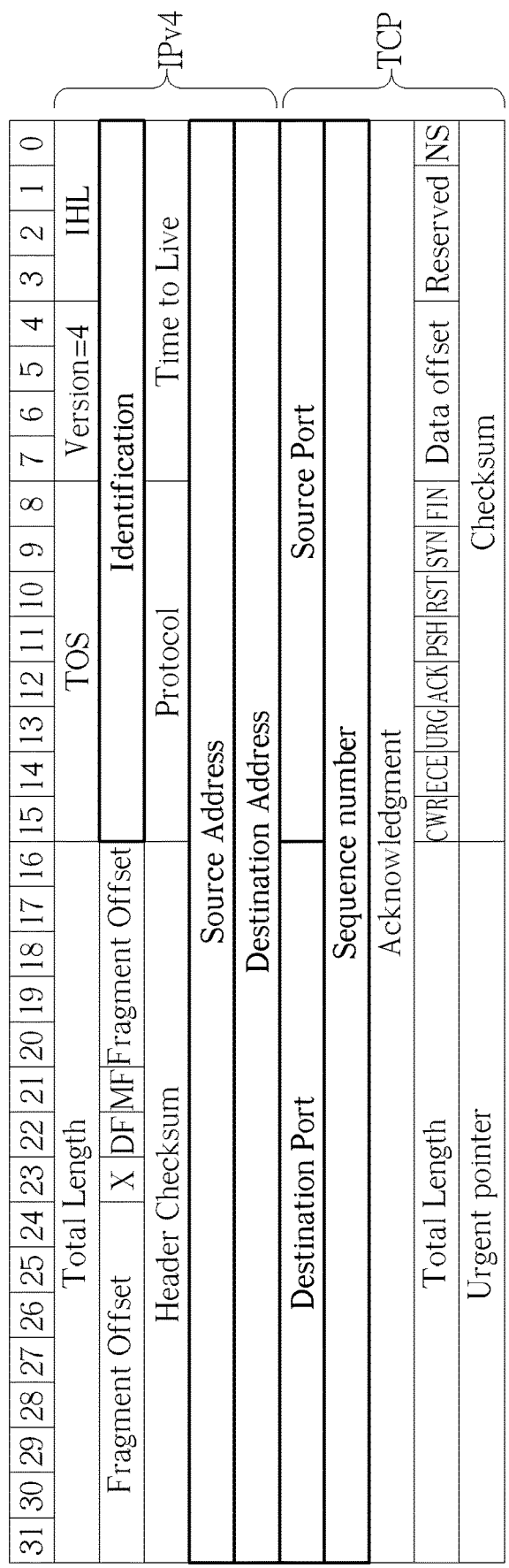
FIG. 8 shows the exemplary fields of an IP packet.

According to an embodiment of the invention, in step S704, determining whether the condition with respect to the content is met includes determining whether the content of the received packet belongs to an application that has registered to the PDCP layer logic (the first logic). In one embodiment, the application that wants to provide smooth communication service with less timing latency may register with the PDCP layer logic by providing its header pattern as a registered header pattern. The header pattern may comprise Internet Protocol (IP) content such as a source address and a destination address in IP version 4 (IPv4) header, and a source port and a destination port in transmission control protocol (TCP) header. FIG. 8 shows an exemplary IP packet format.

Then, when the PDCP layer logic receives a packet, it may parse the PDCP SDU to obtain the IP content of the received packet, and determine whether the IP content of the received packet is a match with the registered header pattern. When the IP content of the received packet matches the registered header pattern, the PDCP layer logic may perform step S706 to deliver the received packet to the upper layer logic. Then the corresponding application may receive the packet without waiting for the expiry of the timer t-Reordering, and more efficient packet delivering can be achieved.

According to another embodiment of the invention, in step S704, determining whether the condition with respect to the content is met further includes determining the content of the received packet is continuous for an application. In one embodiment, the PDCP layer logic may determine whether the received packet and one or more packet previously delivered to the upper layer logic for the registered application are continuous based on at least one of identification in IPv4 header and the sequence number in TCP header as shown in FIG. 8.

Figure 5:
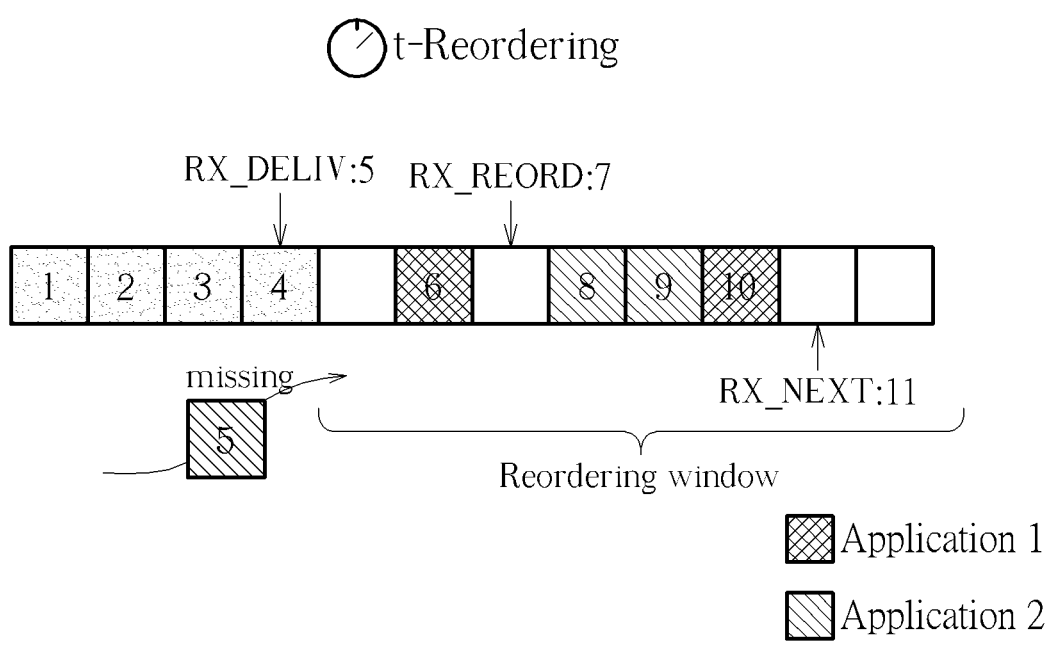
FIG. 5 is another exemplary scenario showing the packet delivering order when the PDCP reordering is configured according to an embodiment of the invention.

Taking the exemplary scenario shown in FIG. 5 as an example, suppose that packet 4 and packet 6 are continuous packets for Application 1, the sequence numbers of packets 4 and 6 are consecutive numbers (for example, 2 and 3). Therefore, in the second embodiment of the invention, when determining that the IP content of the received packet (e.g., the packet 6) matches the registered header pattern of Application 1 and the received packet and the packet previously delivered to the upper layer logic for the registered application (e.g., the packet 4) are continuous packets in step S704, the PDCP layer logic may perform step S706 to deliver the received packet to the upper layer logic.

As discussed above, in the conventional design, the undesired internal timing latency may be generated when the timer t-Reordering is started. Different from the conventional design, by applying the methods for efficiently delivering packets within a communications apparatus, when PDCP reordering is configured, even though the timer t-Reordering is started, the application does not have to wait for the expiry of the timer t-Reordering and the problem of unnecessary and undesired timing latency can be solved.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors or one or more processor logics that control the above discussed function. The one or more processors or one or more processor logics can be implemented in numerous ways, such as with dedicated hardware, or with general purpose hardware that is programmed using microcode or software to perform the functions recited above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications apparatus, comprising:
a receiver circuit, configured to receive wireless signals via at least one antenna and comprising a plurality of hardware devices to perform radio frequency (RF) conversion and RF signal processing, wherein the wireless signals comprise a plurality of packets; and
a processor circuit, coupled to the receiver and comprising a first logic configured to perform operations of a first protocol layer and a second logic configured to perform operations of a second protocol layer higher than the first protocol layer, wherein the operations of the first protocol layer comprises:
starting a timer in response to receiving a first packet with a first count value that is different from a deliver count value; and delivering a second packet with a second count value that is different from the deliver count value from the first protocol layer performed by the first logic to the second protocol layer, which is higher than the first protocol layer, performed by the second logic before the timer expires.

2. The communications apparatus of claim 1, wherein the first protocol layer is a Packet Data Convergence Protocol (PDCP) layer.

3. The communications apparatus of claim 2, wherein the second protocol layer includes at least one of an Internet layer, a transport layer, and an application layer.

4. The communications apparatus of claim 1, wherein the deliver count value is a count value of a first not delivered packet, but still waited for.

5. The communications apparatus of claim 1, wherein the timer is a t-Reordering timer as defined in a 3rd-Generation Partnership Project (3GPP) specification TS 38.323.

6. The communications apparatus of claim 1, wherein the operations of the first protocol layer further comprises:
determining whether a condition with respect to content of the second packet is met,
wherein delivering the second packet to the second logic is performed in response to the condition being determined as having been met.

7. The communications apparatus of claim 6, wherein determining of whether the condition with respect to the content of the second packet is met further comprises:
determining whether the content of the second packet belongs to an application that has registered to the first logic.

8. The communications apparatus of claim 6, wherein determining of whether the condition with respect to the content of the second packet is met further comprises:
determining whether the content of the second packet is continuous for an application.

9. A method for delivering packets within a communications apparatus, comprising:
starting a timer in response to receiving a first packet with a first count value that is different from a deliver count value by a first logic configured to perform operations of a first protocol layer; and
delivering a second packet with a second count value that is different from the deliver count value from the first protocol layer performed by the first logic to a second protocol layer, which is higher than the first protocol layer, performed by a second logic before the timer expires.

10. The method of claim 9, wherein the first protocol layer is a Packet Data Convergence Protocol (PDCP) layer.

11. The method of claim 10, wherein the second protocol layer includes at least one of an Internet layer, a transport layer, and an application layer.

12. The method of claim 9, wherein the deliver count value is a count value of a first not delivered packet, but still waited for.

13. The method of claim 9, wherein the timer is a t-Reordering timer as defined in a 3rd-Generation Partnership Project (3GPP) specification TS 38.323.

14. The method of claim 10, further comprising:
determining whether a condition with respect to content of the second packet is met,
wherein the step of delivering the second packet to the second logic is performed in response to the condition being determined as having been met.

15. The method of claim 14, wherein the step of determining whether the condition with respect to the content of the second packet is met further comprises:
determining whether the content of the second packet belongs to an application that has registered to the PDCP layer logic.

16. The method of claim 14, wherein the step of determining whether the condition with respect to the content of the second packet is met further comprises:
determining whether the content of the second packet is continuous for an application.

* * * * *